Nov. 10, 1936.   L. A. UMANSKY   2,060,647
CONTROL SYSTEM
Filed Dec. 13, 1934
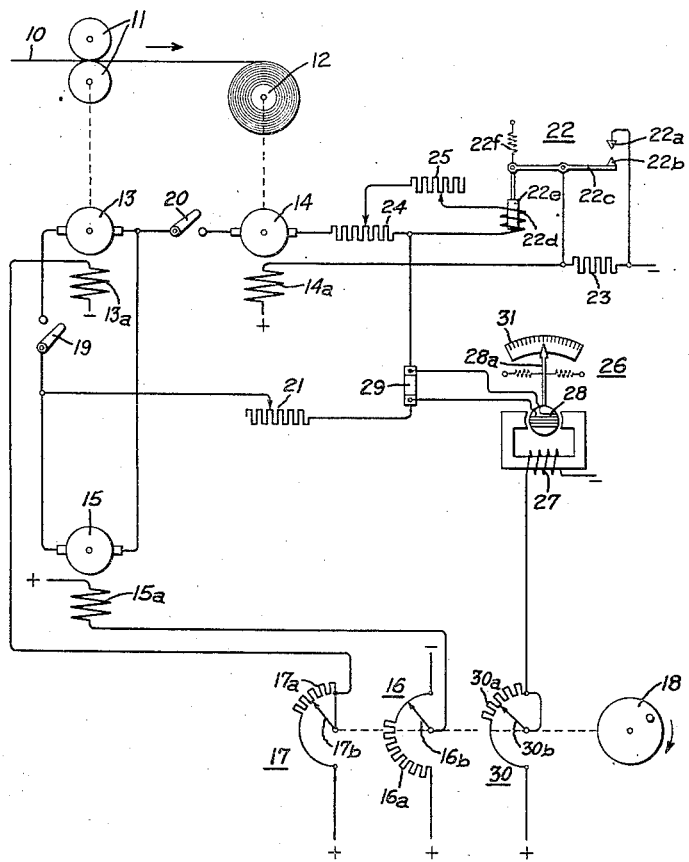
Inventor:
Leonid A. Umansky,
by Harry E. Dunham
His Attorney.

Patented Nov. 10, 1936

2,060,647

UNITED STATES PATENT OFFICE 2,060,647

CONTROL SYSTEM

Leonid A. Umansky, Schenectady, N. Y., assignor to General Electric Company, a corporation of New York Application December 13, 1934, Serial No. 757,282

5 Claims. (Cl. 80—32)

This invention relates to control systems for strip rolling mills and the like, and it has for an object the provision of means for accurately indicating the tension in the strip at all speeds thereof.

In one aspect, the invention relates to systems in which the mill rolls and a reel for coiling the strip under tension are respectively driven by individual motors, and in which means are provided for varying the speed of the strip and mill while maintaining the voltage supplied to the motors substantially constant. For any one strip speed, the current input to the reel motor is a measure of the tension under which the strip is being wound on the reel. If the strip speed is adjusted by simultaneously varying the voltage supplied to both mill and reel motors, as by adjusting the voltage of the supply generator, the proportionality between the current input to the reel motor and the strip tension is maintained and the motor current remains a substantially true measure of the tension.

However, if the rolling speed is increased by weakening the field of the mill motor, while the voltage of the reel motor is maintained substantially constant, then the proportionality between strip tension and current input to the reel motor changes and consequently the same value of reel motor current means a lower strip tension. Therefore, the mere provision of an ammeter in the armature circuit of the reel motor will not under such conditions give the operator a true indication of the strip tension at all speeds, and an ammeter calibrated in terms of pounds of strip tension would therefore be incorrect. Consequently, a more specific object of this invention is the provision of means for overcoming this difficulty.

In carrying the invention into effect in one form thereof, the rolls and reel are each driven by respective motors supplied from a variable voltage supply generator and means are provided for varying the mill and strip speeds while maintaining the voltages supplied to the motors substantially constant, together with means responsive to the reel motor current for indicating the tension of the strip and means operatively associated with the strip speed varying means for automatically recalibrating the tension indicating means so that its indications are proportional to strip tension for all strip speeds.

For a better and more complete understanding of the invention, reference should now be had to the following specification and to the accompanying drawing, the single figure of which is a simple, diagrammatical illustration of an embodiment of the invention.

Referring now to the drawing, a strip of material 10, such for example as a strip of cold steel, is passed through thickness reducing rolls 11, and is delivered to a reel 12 by means of which it is coiled under tension. The mill rolls 11 and a reel 12 are driven by suitable driving means, illustrated in the drawing as direct current motors 13 and 14 respectively. The motors 13 and 14 are supplied from a suitable source, such for example as the variable voltage generator 15, to which the motors 13 and 14 are connected in parallel as shown. Instead of being supplied from a variable voltage generator, motors 13 and 14 may be supplied from a constant voltage source if desired.

The motor 13 is provided with a separately excited field winding 13a, which is connected to a suitable source of direct current represented in the drawing by plus and minus signs. Similarly the variable voltage supply generator 15 is provided with a separately excited field winding 15a which is supplied from a suitable source, represented by plus and minus signs, which source may be and preferably is the same as that to which the field winding 13a is connected. Suitable means, illustrated as a rheostat 16 comprising a resistance section 16a and a movable contact 16b are included in circuit with the field winding 15a for varying the excitation of the generator 15. By this means, the speed of the mill and, therefore, the linear speed of the strip may be changed by voltage control up to the "basic speed" of the mill motor 13. Above this basic speed of the mill motor, the rolling speed is adjusted to any desired value by suitable means illustrated as a rheostat 17 having a resistance section 17a connected in circuit with the field winding 13a and a movable contact member 17b cooperating with the resistance.

The movable contacts 16b and 17b are mounted upon a common shaft which is rotated by any suitable means illustrated as a hand wheel 18.

The resistance sections 16a and 17a are so arranged with respect to their movable contacts that the field 13a of the mill motor is not weakened until the generator field is fully excited. Obviously, if motors 13 and 14 were supplied from a constant voltage source, the rheostat 16 would not be used and the entire working range of the mill speed would be controlled by the field weakening resistance 17 in the circuit of the mill motor field.

A suitable switching device 19 is provided for completing and interrupting connections between the mill motor 13 and the supply generator 15 and a similar switching device 20 is provided for performing similar functions with respect to the reel motor 14. A suitable starting resistor 21 is included in the armature circuit of the reel motor 14. Starting and accelerating devices of the type utilized in connection with rolling mill drives are often very complicated, and therefore the starting and accelerating device 21 is shown simply as a variable resistance for the purpose of simplicity.

The current input to the reel motor 14 is controlled by means of a suitable constant current regulator 22 which is illustrated as a vibratory contact type regulator. Briefly, this regulator comprises a section of resistance 23 included in circuit with the field winding 14a of the reel motor 14 together with a pair of contacts 22a, 22b for alternately inserting and short circuiting the resistance 23 at rapid intervals. As shown, the contact 22a is stationary and the cooperating contact 22b is carried on a pivotally mounted lever arm 22c. A solenoid 22d is connected to be responsive to the voltage drop across a resistance 24, or portion thereof, in the armature circuit of the reel motor. The voltage drop across the resistance 24 is, of course, a measure of the current in the motor circuit as is well understood. The solenoid 22d is provided with a core member 22e which is pivotally attached to the end of the lever arm 22c so that the pull of the solenoid balances the tension of a spring 22f. A variable resistance 25 is included in circuit with the coil 22d for changing the setting of the regulator to hold any desired value of motor current.

The operation of the regulator to hold constant current in the motor circuit is briefly as follows:

With the contacts 22a and 22b separated as shown, the resistance 23 is in circuit with the field winding 14a. This weakens the field which causes the motor to tend to increase its speed by drawing a larger armature current from the supply 15. The armature current tends to increase rapidly to a value in excess of that which the regulator is set to hold. When the armature current exceeds this predetermined value the pull of the coil 22d overpowers the pull of the spring 22f and causes the contacts 22b and 22a to close and short circuit the resistance 23. This strengthens the field of the reel motor 14 and causes its armature current to decrease. This opening and closing action of the contacts 22a and 22b continues at a very rapid rate and as a result the armature current of the motor 14 is maintained substantially constant at the desired value which is proportional to the ratio between the length of time the contacts 22a and 22b are opened to the time they are closed.

The current input to the reel motor 14 for any given rolling speed, is approximately proportional to the tension under which the strip is being coiled on the reel 12 regardless of the increase of diameter of the coil. As long as the speed of rolling is adjusted by varying the voltage of the generator 15 from which the mill motor 13 and reel motor 14 are supplied, the proportionality between the current input to the motor 14 and the strip tension is maintained. However, if the rolling speed is increased by weakening the field of the mill motor 13, then the same current input to the reel motor 14 will actually mean a lower strip tension. This is clear from the following consideration. As long as the voltage and current of the reel motor 14 remain constant the horse-power of the motor remains constant. The horse-power of the motor 14, however, is a function of the product of the speed and tension of the strip 10, and is represented by the equation $$(I) \quad HP = \frac{T \times S}{33000}$$

in which
HP = horse-power of motor 14
T = tension in the strip between rolls 11 and reel 12
S = speed of the strip.

Clearly if the horse-power of motor 14 is maintained constant and the strip speed S is increased by weakening the field of the mill motor 13, the tension T of the strip between the mill rolls 11 and the reel 12 will have to decrease. Although the tension of the strip is varied, the armature current of the reel motor 14 is maintained constant by the constant current regulator 22, and thus the armature current is not a true measure of the strip tension at the new speed.

For the purpose of providing an accurate indication of the tension of the strip at all operating speeds of the mill, means, illustrated as a meter 26, having substantially a watt-meter element with a stationary coil 27 and a movable coil 28 are provided. The movable coil 28 is energized from a shunt 29 which is connected in the armature circuit of the reel motor 14. The stationary coil 27 is shown connected across the constant voltage D. C. supply, which is represented by the plus and minus signs and which is preferably the same as that from which the field windings of the motor and generator are supplied. A rheostat 30 having a resistance 30a connected in circuit with the stationary coil 27 and having a cooperating movable contact 30b is provided for varying the current in the stationary coil and thus changing the calibration of the meter. As shown, the movable coil 28 is provided with a needle 28a which cooperates with a stationary scale 31 calibrated in pounds tension of the strip.

The movable contact 30b of the calibrating rheostat is mounted on the shaft with the contacts 16b and 17b so that it is rotated when the handwheel 18 is rotated to vary the speed of the mill. It will be noted, however, that the rheostat 30 is so arranged that the resistance is not altered as long as the mill speed is adjusted by variation of the generator voltage, i. e. by varying the amount of the resistance 16a in circuit with the generator field. However, when the mill speed is increased by increasing the resistance in the field circuit of the mill motor 4, additional resistance is inserted in circuit with the stationary coil 27 of the meter. As thus constructed and arranged the meter 26 is an ammeter responsive to the reel motor current for any one rolling speed of the strip, and its calibration is changed whenever the rolling speed is adjusted by field control of the mill motor.

With the above understanding of the elements and their organization and connections in the completed system, the operation of the system itself will readily be understood from the following description:

With the switches 19 and 20 closed, the mill is operating at a speed that is dependent upon the positions of the movable contact arm of the speed regulating resistances 16 and 17. The constant current regulator 22 maintains the current input to the reel motor substantially constant in the manner described at a previous point in the specification. As the handwheel 18 is rotated in a clockwise direction, the resistance 16a is eventually all cut out of the field of the supply generator 15, and the latter is generating full voltage with the result that the mill motor 13 and the reel motor 14 are both operating at basic speed. The armature current drawn by the reel motor causes the movable element of the meter 26 to deflect, and as long as the rolling speed is adjusted by varying the voltages supplied to the motors 13 and 14 by the supply generator 15, the deflection of the meter 26 is proportional to and a true indication of the tension of the strip. Further rotation of the handwheel 18 in the clockwise direction inserts resistance in the field of the mill motor 13 thereby increasing the speed of the mill motor and likewise increasing the rolling speed of the strip. Since the voltage supplied to the reel motor 14 from the generator 15 now remains constant and since the armature current of the reel motor 14 is maintained constant by the regulating device 22, the tension of the strip decreases. Since the armature current of the reel motor is the same as before, the deflection of the meter 26 would remain the same if it were not for the rheostat 30. The movable contact 30b of the rheostat 30 is so arranged on its shaft that it begins to insert resistance in the circuit of the stationary coil 27 at the same time that the movable contact 17b inserts resistance in the field circuit of the mill motor 13. This results in decreasing the excitation of the stationary coil 27 and in likewise decreasing the deflection of the needle 28a. In other words, the calibration of the meter 26 is automatically changed in proportion to the amount that the rolling speed and tension of the strip are changed by field control of the mill motor.

As the rolling speed of the strip is progressively increased by weakening the field of the mill motor 13, the tension of the strip is progressively decreased. Simultaneously the excitation of the stationary coil 27 of the tension meter is progressively decreased so that its deflection decreases in proportion as the tension of the strip increased. Thus, although the current input to the reel motor 14 remains constant, the tension meter is automatically recalibrated so that its deflection is a true indication of the actual tension of the strip at all speeds throughout the entire speed range of the mill.

If the operator desires to maintain the tension of the strip constant at all rolling speeds, it is only necessary for him to adjust either the resistance 24 or the resistance 25 to change the setting of the constant current regulator 22 until the tension of the strip is the desired value as indicated by the deflection of the tension meter 26.

In laying out the resistance 30a of the rheostat 30, due consideration is given to the saturation curve of the mill motor 13, with the result that the tension meter 26 gives sufficiently accurate indications of the tension of the strip at all operating speeds of the mill.

Although in accordance with the provisions of the patent statutes, this invention is described as embodied in concrete form, it will be understood that the apparatus and connections shown are merely illustrative and that the invention is not limited thereto since alterations and modifications will readily suggest themselves to persons skilled in the art without departing from the true spirit of this invention or from the scope of the annexed claims.

What I claim as new and desire to secure by Letters Patent of the United States, is:—

1. In combination in a control system for strip rolling mills and the like having reducing rolls and a tensioning reel, a motor for driving said rolls, a second motor for driving said reel, control means for varying the speed of the mill while maintaining the voltage supplied to said mill motor substantially constant, a device responsive to the input to said reel motor for indicating the tension of said strip, and means operably associated with said speed adjusting means for controlling said device to indicate the correct tension of said strip when the speed of said mill is changed by said adjusting means.

2. In a control system for strip rolling mills and the like having reducing rolls and a tensioning reel, the combination with a motor for driving the rolls and a separate motor for driving the reel of means for adjusting the speed of the mill while maintaining the voltage supplied to said roll driving motor substantially constant, a device responsive to the current input to said reel motor for indicating the tension of the strip, and means actuated in response to operation of said speed adjusting means for recalibrating said device so that its indications are substantially proportional to the tension of the strip for all strip speeds.

3. In a control system for strip rolling mills and the like having reducing rolls and a tensioning reel, the combination with a motor for driving the rolls and a separate motor for driving the reel, a variable resistance in the field circuit of said roll driving motor for adjusting the speed of the strip while maintaining the voltage supplied to said roll drive motor substantially constant, a device responsive to the current input to said reel motor for indicating the tension of the strip, and a variable resistance connected in circuit with said device and operably associated with said speed adjusting resistance for recalibrating said device so that its indications are proportional to the tension of the strip at all speeds thereof.

4. In a control system for strip mills and the like having rolls operating on the strip and a reel for coiling the strip under tension, the combination with a motor for driving the rolls and an additional motor for driving the reel, of a variable voltage generator for supplying both said motors, means for varying the speed of the mill motor to vary the strip speed while maintaining the voltage of said generator substantially constant, an electro-responsive device responsive to the current input to said reel motor and calibrated to indicate the tension of the strip, and means connected to said speed varying means for recalibrating said device so that its deflections are proportional to the tension of the strip for all strip speeds.

5. A control system for strip rolling mills and the like, the combination with a mill for operating on the strip and a reel for coiling the strip under tension, of a motor for driving said mills, a second motor for driving said reel, a variable voltage generator for supplying said motors and controlling the speeds thereof, a variable resistance in the field circuit of said mill motor for varying the speed of the mill and strip while maintaining the voltage supplied to said mill motor substantially constant, an electroresponsive indicating device energized in accordance with the current input to said reel motor and calibrated so that its deflections indicate the tension of the strip and a variable resistance connected in circuit of said device and operatively connected with said speed varying resistance for recalibrating said tension indicating device so that its deflections are proportional to the tension of the strip irrespective of changes in strip speed produced by varying the field strength of said mill motor.

LEONID A. UMANSKY.